(12) United States Patent
Peyman et al.

(10) Patent No.: US 12,458,246 B2
(45) Date of Patent: Nov. 4, 2025

(54) MINIATURE WEARABLE CAPNOGRAPHY DEVICE

(71) Applicants: Nazmi Peyman, Richmond, VA (US); Edmond Zahedi, Burnaby (CA)

(72) Inventors: Nazmi Peyman, Richmond, VA (US); Edmond Zahedi, Burnaby (CA)

( * ) Notice: Subject to any disclaimer, the term of this patent is extended or adjusted under 35 U.S.C. 154(b) by 309 days.

(21) Appl. No.: 17/511,476

(22) Filed: Oct. 26, 2021

(65) Prior Publication Data
US 2022/0125332 A1     Apr. 28, 2022

Related U.S. Application Data
(60) Provisional application No. 63/105,753, filed on Oct. 26, 2020.

(51) Int. Cl.
*A61B 5/083*     (2006.01)
*A61B 5/00*      (2006.01)

(52) U.S. Cl.
CPC ............ *A61B 5/0836* (2013.01); *A61B 5/002* (2013.01); *A61B 5/6819* (2013.01); *A61B 5/682* (2013.01); *A61B 5/7405* (2013.01); *A61B 5/7455* (2013.01); *A61B 5/746* (2013.01); *A61B 2560/0219* (2013.01); *A61B 2560/0223* (2013.01)

(58) Field of Classification Search
CPC .................. A61B 5/082; A61B 5/0826; A61B 5/083–0836; A61B 5/002–0022; A61B 5/4818; A61B 5/6819; A61B 5/682; A61B 5/7405; A61B 5/7455; A61B 5/746; A61B 2560/0219; A61B 2560/0223
See application file for complete search history.

(56) References Cited

U.S. PATENT DOCUMENTS

| | | | |
|---|---|---|---|
| 2003/0149372 A1* | 8/2003 | Smith | A61B 5/083 600/532 |
| 2009/0299210 A1* | 12/2009 | Marcarian | A61B 5/4561 600/595 |
| 2010/0081957 A1* | 4/2010 | Hyde | A61M 15/02 600/300 |
| 2012/0330161 A1* | 12/2012 | Kobayashi | A61B 5/082 600/476 |
| 2016/0029922 A1* | 2/2016 | Bar-Lev | A61B 5/682 600/324 |
| 2018/0000378 A1* | 1/2018 | Viertio-Oja | A61B 5/0803 |
| 2019/0134396 A1* | 5/2019 | Toth | A61B 5/4818 |
| 2019/0175064 A1* | 6/2019 | Haveri | A61M 16/0666 |
| 2019/0282096 A1* | 9/2019 | Vardi | A61B 5/0205 |
| 2022/0054008 A1* | 2/2022 | Venkatraman | G16H 50/70 |

* cited by examiner

*Primary Examiner* — Eric F Winakur
(74) *Attorney, Agent, or Firm* — Barry Choobin; Patent 360

(57) ABSTRACT

A wearable capnography device implemented in a form of piercing jewelry that can be worn in a nose or a mouth. The device includes miniaturized sensors to measure pCO2 values continually, wherein the sensor is positioned such as when the device is worn, the sensor is exposed to expired air from the nose or the mouth respectively. The wearable capnography device can be wirelessly coupled to an ear-worn receiver, which upon receiving a signal from the wearable capnography device can generate an audio and vibratory alarm.

9 Claims, 7 Drawing Sheets

MINIATURE WEARABLE CAPNOGRAPHY DEVICE

This application claims priority from a U.S. provisional patent application Ser. No. 63/105,753 filed on Oct. 26, 2020, which is incorporated herein by reference to its entirety.

BACKGROUND

Monitoring the concentration of the end-tidal partial pressure of $CO_2$ ($pCO_2$) has become the standard of care in the field of anesthesia. This is due to significant evidence pointing to the fact that it would take a relatively long time, in some cases up to a couple of minutes, for the effects of hypoventilation and apnea to show in the form of a significant oxygen saturation drop. If hypoventilation and apnea are not detected on time, acidosis and irreversible damage and changes could occur in the cardiac and/or central nervous system tissues. This may include arrhythmias, cardiac ischemic events and or myocardial infarctions, central nervous system ischemic events, and possible permanent damage and stroke. Every second and minute matters in these situations. Such medical conditions are not limited to the anesthesia operating room settings but can affect patients outside of the operating room as well.

Patients on pain killers and central nervous system suppressants are at increased risk of developing the events, especially while sleeping. For example, patients on opioid pain medications and benzodiazepines, and other hypnotic and central nervous system suppressants are at greater risks of developing hypoventilation and apnea. These risks are even higher in patients who have a history of obstructive or central sleep apnea. There is ample evidence that co-prescribing these medications can increase the above risks significantly. While the Center for Disease Control and many State Boards of Medicine in the US have issued warnings and guidelines against prescribing these medications, there are cases where clinicians are left without any other choice rather than to prescribe them. In addition to taking prescription medications, consumption of alcoholic beverages and other illicit or over-the-counter central nervous system and respiratory depressants may add to this risk.

Apnea monitors and oxygen saturation monitors are very popular and fairly available; however, they do not solve the aforesaid problems. Using the known apnea monitors or the oxygen saturation monitors, it may be too late before any conclusive results are obtained.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

It is therefore a principal object of the present invention directed to a small-size, wearable capnography device to continuously monitor end-tidal $pCO_2$, even while the patient is asleep.

It is another object of the present invention that the wearable capnography device can detect hypoventilation a lot earlier than apnea monitors.

It is still another object of the present invention that the wearable capnography device can detect apnea and hypoventilation many seconds and even minutes before oxygen saturation monitors.

It is yet another object of the present invention that the wearable capnography device can help prevent myocardial and CNS damage and possibly acidosis and cardiac arrhythmias.

It is a further object of the present invention that the wearable capnography device can be worn like jewelry.

It is still a further object of the present invention that the wearable capnography device can be fixedly worn.

In one aspect, disclosed is a wearable capnography device that can be worn permanently and in a concealed manner. The wearable capnography device can continuously measure the end-tidal $pCO_2$ of a person and communicate these values to a nearby receiver. The device can be calibrated as and when desired. Additionally, the device can trigger alarms based on pre-set criteria to alert the person.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

Figure 1:
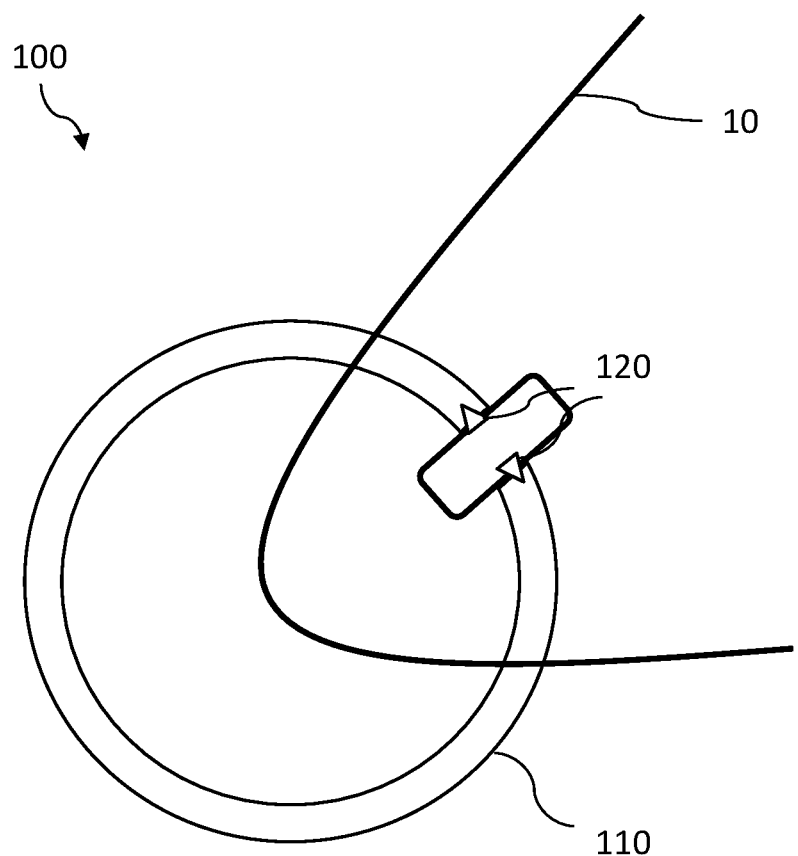
FIG. 1 shows the wearable capnography device implemented as a cosmetically acceptable nose-piercing jewelry, according to an exemplary embodiment of the present invention.

The drawings referred to in this description should be understood as not being drawn to scale except if specifically indicated.

DESCRIPTION OF EMBODIMENTS

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a wearable capnography device that can be miniature and could be worn like jewelry. Perhaps, the disclosed wearable capnography device can be implemented as or in cosmetically acceptable jewelry that can be worn around the nose or mouth. The electronic components including the sensors can be concealed providing an aesthetic appearance to the wearable capnography device implemented as cosmetically acceptable jewelry. In one case, the capnography device implemented as jewelry can be manufactured in a range of designs and sizes that can be worn by a user in nose or mouth, and as such the embedded sensors in the wearable capnography device are exposed to exhaled air from the nose or the mouth. Moreover, the wearable capnography device can be manufactured using a range of materials, such as precious metals, alloys, polymers, polycarbonates, and like.

Referring to FIG. 1 which shows an exemplary embodiment of the wearable capnography device 100 implemented as a nose-piercing ring. The wearable capnography device 100 includes a body 110 implemented in the form of cosmetically acceptable piercing jewelry. FIG. 1 shows the body 110 in the form of a nose piercing ring. The body 110 can be made of any medical grade material, or biocompatible precious metals, polycarbonates, plastics, and like. The body 110 can be manufactured in a range of designs, colors, and shapes for an aesthetic appearance. The body 110 of the wearable capnography device 100 can also include a fastening mechanism that may allow putting in the wearable capnography device. Such a fastening mechanism is known to a person skilled in the art of piercing jewelry, and any such mechanism to put in the piercing jewelry known to a skilled person is within the scope of the present invention.

The wearable capnography device 100 can also include one or more sensors positioned in such a way that they are exposed to exhaled respiratory gases, allowing for the wearable capnography device to measure the value of the $EtCO_2$. FIG. 1 shows a two-part sensor 120 embedded in the body 110, such as when the wearable capnography device is put in the nose, the sensor 120 can spatially be within the nose cavity and exposed to the exhaled respiratory gases. FIG. 1 also illustrates a nasal contour 10 and the wearable capnography device 100 worn in the nose, with the sensor 120 spatially positioned within the nasal contour 10. In a preferred embodiment, the sensor can be of an ultra-miniature size to be embedded in the body 110 and that can continually measure the partial pressure of CO2 ($EtCO_2$) in the exhaled air.

The wearable capnography device 100 can logically compare the measured values of the $pCO_2$ with preset threshold values or a range using a set of predefined rules. In case, the measured values are not in accord with the preset threshold values or a range, the wearable capnography device can trigger a notification and/or alarm to inform/alert about the abnormal values of the measured $pCO_2$. The values of the $pCO_2$ in accord with the preset threshold values or a range can be considered as normal values and any value outside the preset threshold values or range can be considered as an abnormal value. The abnormal measured value of $pCO_2$ can pose a risk of hypoventilation and apnea, and other medical conditions as a result of hypoventilation and apnea. The disclosed wearable capnography device can continually monitor the $pCO_2$ values and can notify/alert in near real-time about the abnormal currently measured values of $pCO_2$.

Figure 2:
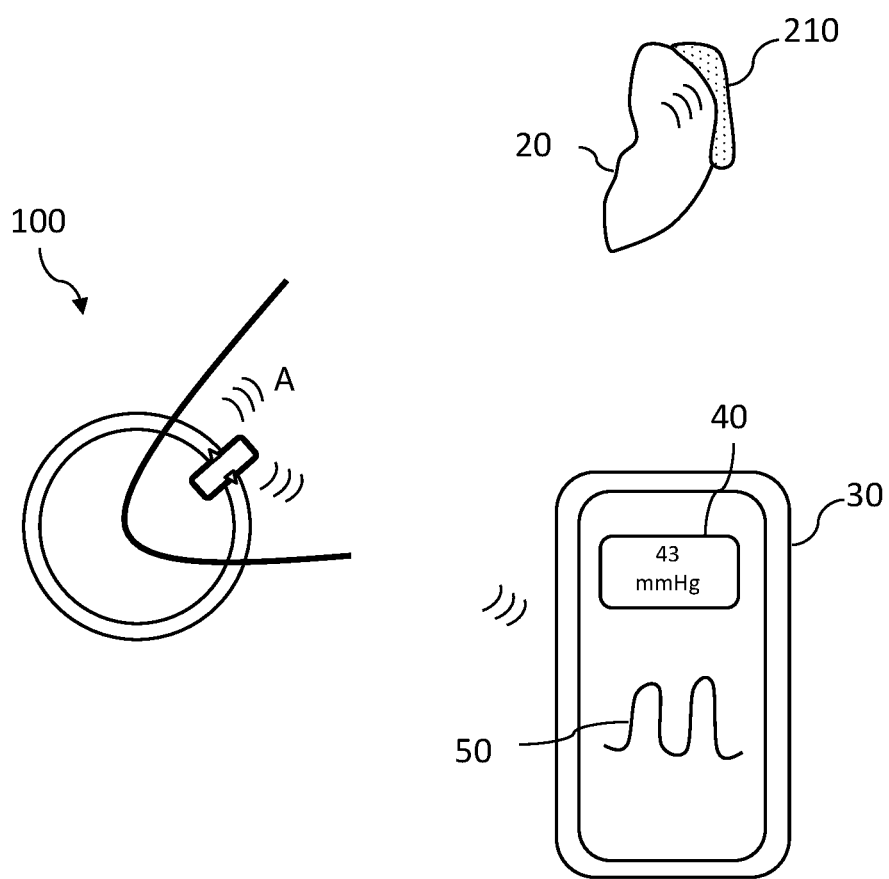
FIG. 2 depicts the wearable capnography device sending notifications to a smartphone and a receiver, according to an exemplary embodiment of the present invention.

The notification can be in the form of an alarm that could draw the immediate attention of the wearer of the wearable capnography device (user) or an authorized/concerned person, who could be a caretaker. The notification can also include $pCO_2$ data values. Referring to FIG. 2 which illustrates the wearable capnography device 100 can send notifications to two devices. Perhaps, the present invention can be advantageous by sending notifications to two or more devices simultaneously. For example, the notifications can be sent to the wearer of the wearable capnography device and a caretaker. Continue referring to FIG. 2, the wearable capnography device 100 can be wirelessly coupled to an ear-worn receiver 210. FIG. 2 shows the ear-worn receiver 210 put on the ear 20, such as the audio alarm can be directly outputted to the ear 20 of the user. The wireless connection between the wearable capnography device 100 and the ear-worn receiver 210 is shown by a symbol A. In certain embodiments, the audio alarms can be combined with vibrators to immediately draw the attention of the user. The intensity of the audio alarms can depend upon the values of measured $pCO_2$. As the objective of the alarm is for the user to take action, if there is no improvement in the end-tidal $pCO_2$ values over a predefined duration, the wearable capnography device can increase the auditory volume of the ear-worn receiver 210 to indicate an emergency requiring immediate attention. Additionally, in case of emergency, i.e., when the medical condition does not improve over time or may worsen, the wearable capnography device can also output an audio alarm to a second external speaker for informing other persons. The second speaker can be a buzzer, or one or more normal entertainment speakers conveniently positioned, and loud enough to be heard in the next rooms. It is understood that the volume and vibrations of the ear-worn receiver 210 can be increased from low intensity to a high intensity up to a certain limit that may not cause any injury to the hearing system. In one implementation, the ear-worn receiver 210 can also be provided with a blinking light for visual notification to nearby persons.

It is understood that FIG. 2 shows only an exemplary embodiment of the receiver worn in the ear, however, other body-worn receivers with or without audio and with or without vibratory motor and with or without light indicators are within the scope of the present invention. For example, notification can be wirelessly transmitted to a body-worn vibrator. In this configuration, end-tidal $pCO_2$ values are constantly compared to preset thresholds and if these values exceed these preset values, the body-worn vibrator starts emitting vibrations to alert the user. If there is no improvement in the end-tidal $pCO_2$ values, auditory alarms are emitted to inform persons in the surrounding area of the alarming condition. It is to be noted that the notifications in the form of vibrations and audio alarms can be sent to more than one receiver simultaneously or at different times, wherein at least one receiver is with the user, while the other receiver can be with the caretaker. In one case, the second speaker can be the speaker of a smartphone or similar electronic device, wherein the wearable capnography device can ring the smartphone. Also, a separate alarm sound/ring tone for the smartphone may be configured for the wearable capnography device to avoid confusing the alarm with the other alarms set in the smartphone.

Continue referring to FIG. 2, which further illustrates the wearable capnography device 100 wirelessly transmitting a notification to a smartphone 30. The wearable capnography device 100 can be wirelessly coupled to a smartphone or similar electronic device, such as a tablet computer, smartwatch, desktop, and like. The wearable capnography device 100 can be equipped with a transmitter that can send details including the measured values to the smartphone 30. The measured values can be date and time stamped. Alternatively, a measured $pCO_2$ value can be transmitted in real-time. The smartphone 30 can include a software application for receiving and analyzing the measured $pCO_2$ values received from the wearable capnography device. Different kinds of analyses can be performed on the $pCO_2$ values measured over a duration to observe trends, outliers, minimum and maximum values, and like parameters that can help a medical professional to assess the health of the user over time. It is understood that the data from the smartphone or the results from the analysis can be securely shared with other devices, such as the device of a medical professional. It is also envisioned that the data can be shared in the form of pre-crafted reports. In one exemplary embodiment, certain features of the wearable capnography device including the comparison of the measured values with the threshold values, triggering alarms, and sending notifications can be implemented in the smartphone. The smartphone 30 in FIG. 2 is further illustrates the $pCO_2$ value 40 and a graph 50.

Additionally, the wearable capnography device 100 can also send emergency messages, SOS, emails, automated calls and like to concern users and optionally to an emergency response team. The message or call may include recorded data values, trends, an indication of the severity of the medical conditions, and the geographical location. In one case, the indication can be the measured and reference values of the $pCO_2$. Such numbers and email addresses can be pre-configured and reconfigured as and when desired.

A standalone electronic device is also envisioned that can be wirelessly coupled to the wearable capnography device. The standalone electronic device can be implemented with all the functionalities described above for the smartphone. The standalone electronic device can be placed nearby the user within a connectivity range of the wearable capnography device. In one case, one or more features of the wearable capnography device including the comparison of the measured values with the preset threshold values, triggering alarms, and sending notifications can be implemented within the standalone electronic device. The standalone electronic device may also include a display. Different analyses as described above using the measured $pCO_2$ values can be performed and presented by the standalone electronic device.

Figure 3:
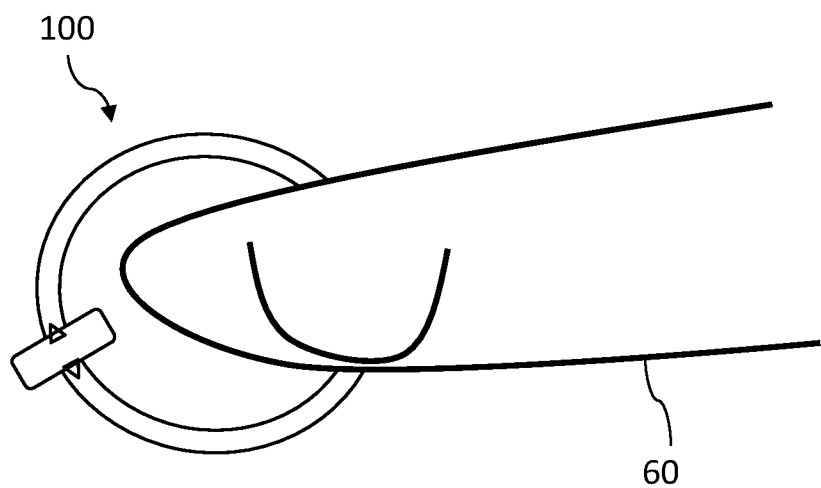
FIG. 3 depicts the wearable capnography device implemented as a cosmetically acceptable tongue-piercing jewelry, according to an exemplary embodiment of the present invention.
Figure 4:
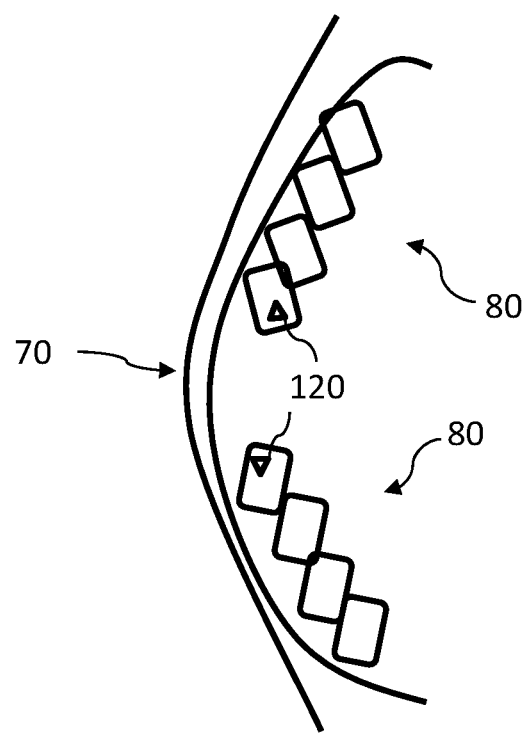
FIG. 4 depicts the wearable capnography device implemented in cosmetically acceptable tooth-cavity, according to an exemplary embodiment of the present invention.

Referring to FIG. 3 which shows the wearable capnography device 100 can also be worn in a tongue 60 similar to a tongue piercing jewelry. Referring to FIG. 4 which shows the two-part sensor 120 are concealed in tooth cavities 80 that can sense the exhaled air from the mouth 70.

Figure 5:
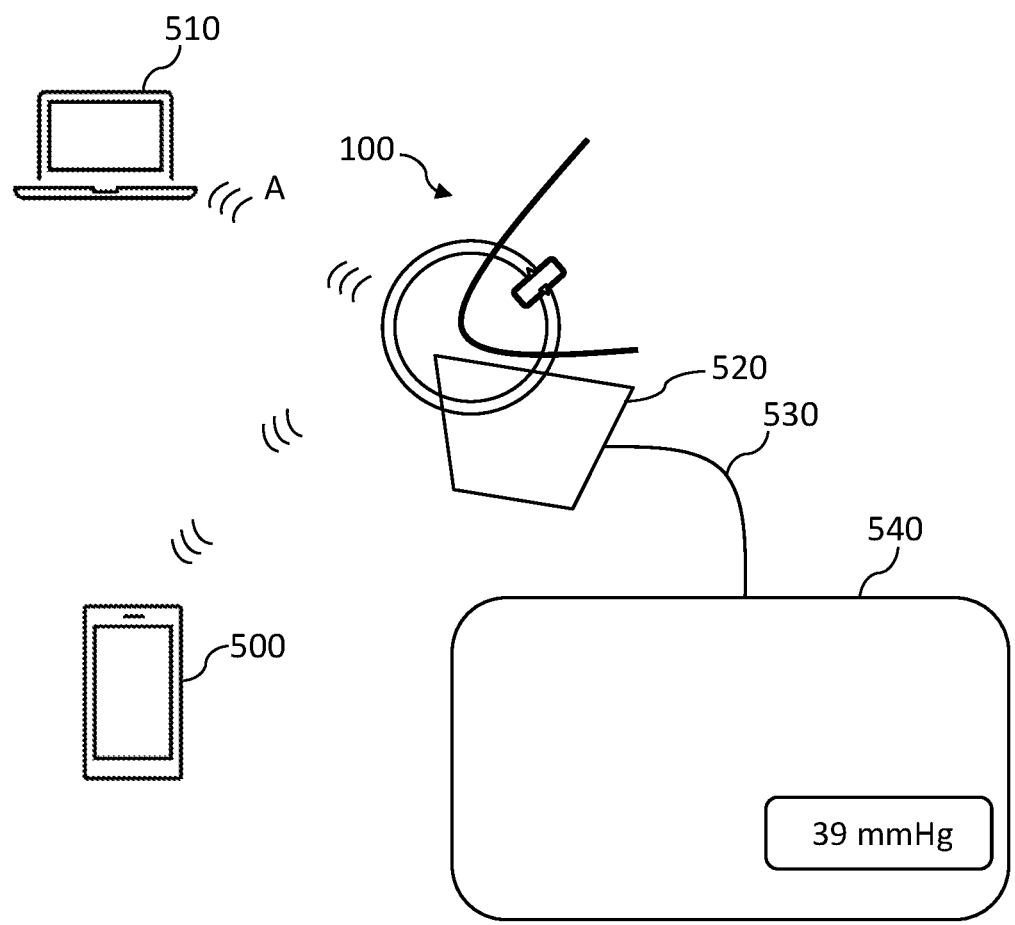
FIG. 5 depicts calibration of the wearable capnography device using a smartphone or a personal computing device, according to an exemplary embodiment of the present invention.

In certain embodiments, the wearable capnography device can be calibrated before implanting. Additionally, the wearable capnography device can also be calibrated occasionally during use to ensure proper function. The calibration may ensure that the measured $pCO_2$ values are reliable and thus periodic calibration may be advisable to ensure accuracy. FIG. 5 shows one embodiment of the calibration process when either a smartphone 500 and/or personal computing device 510 such as a laptop are available. Using a standard calibrated capnography device 540 with a sensor 520 exposed to the same respiratory gases, wherein the sensor 520 is connected to the standard calibrated capnography device 540 through a copper wire 530, the values recorded by the standard calibrated capnography device 540 are compared to the values measured by the disclosed wearable capnography device 100. If these values are within +/−2 mmHg, the wearable capnography device 100 is deemed to be calibrated. Otherwise, the wearable capnography device 100 may need to be calibrated by a technician. This lack of accuracy may also be due to obstructing debris on the sensors which need to be cleaned.

Figure 6:
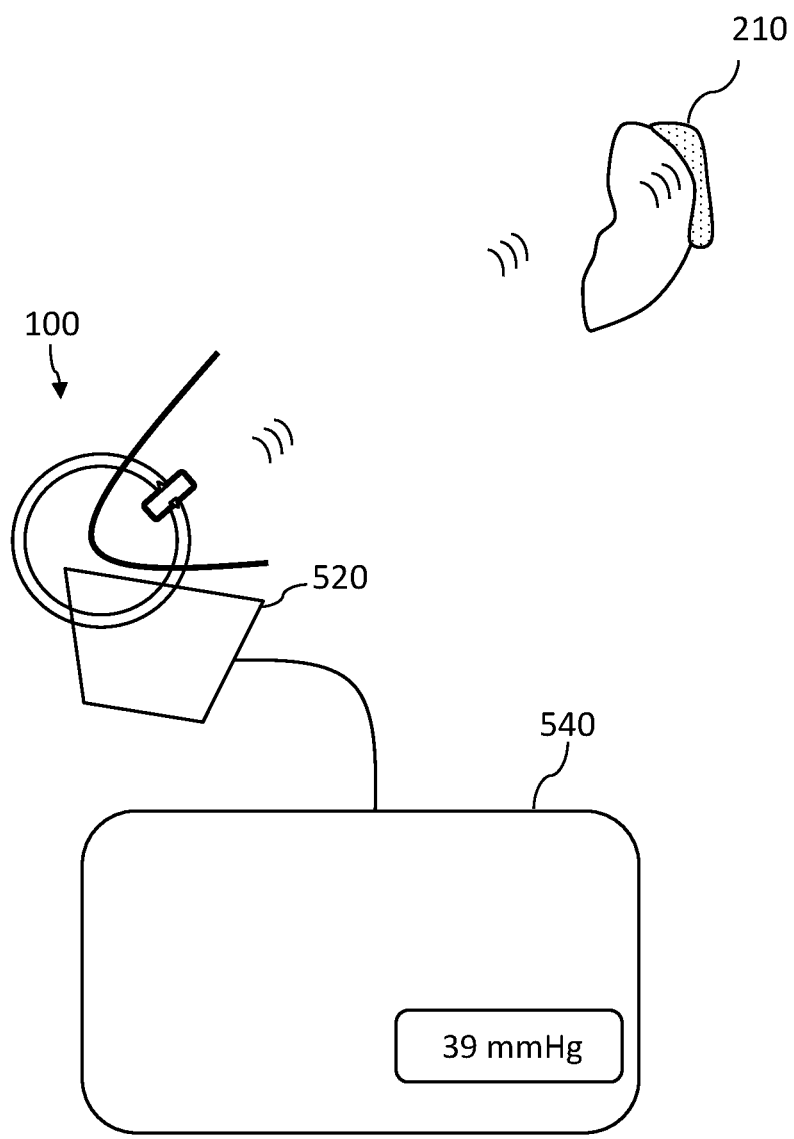
FIG. 6 depicts another exemplary embodiment of calibrating the wearable capnography device without a smartphone or a computing device, according to the present invention.

If a computing platform or a smartphone is not available during the calibration process, the ear-worn receiver 210 can be configured in the calibration mode (FIG. 6). In this mode, a voice-synthesizer embedded in the ear-worn receiver will continuously output the measured values. These values can be compared by the user with the values displayed on the standard calibrated capnography device 540. If these two series of values are within +/−2 mmHg, the system is deemed to be calibrated.

The source of wirelessly transmitted power for the permanently wearable component of the system can be external to the body-worn part. This source can be located in the non-permanently wearable part of the system, such as the ear-worn part or smartphone. As numerous embodiments for wireless power transmission do already exist, there will be no further mention of the details.

Figure 7:
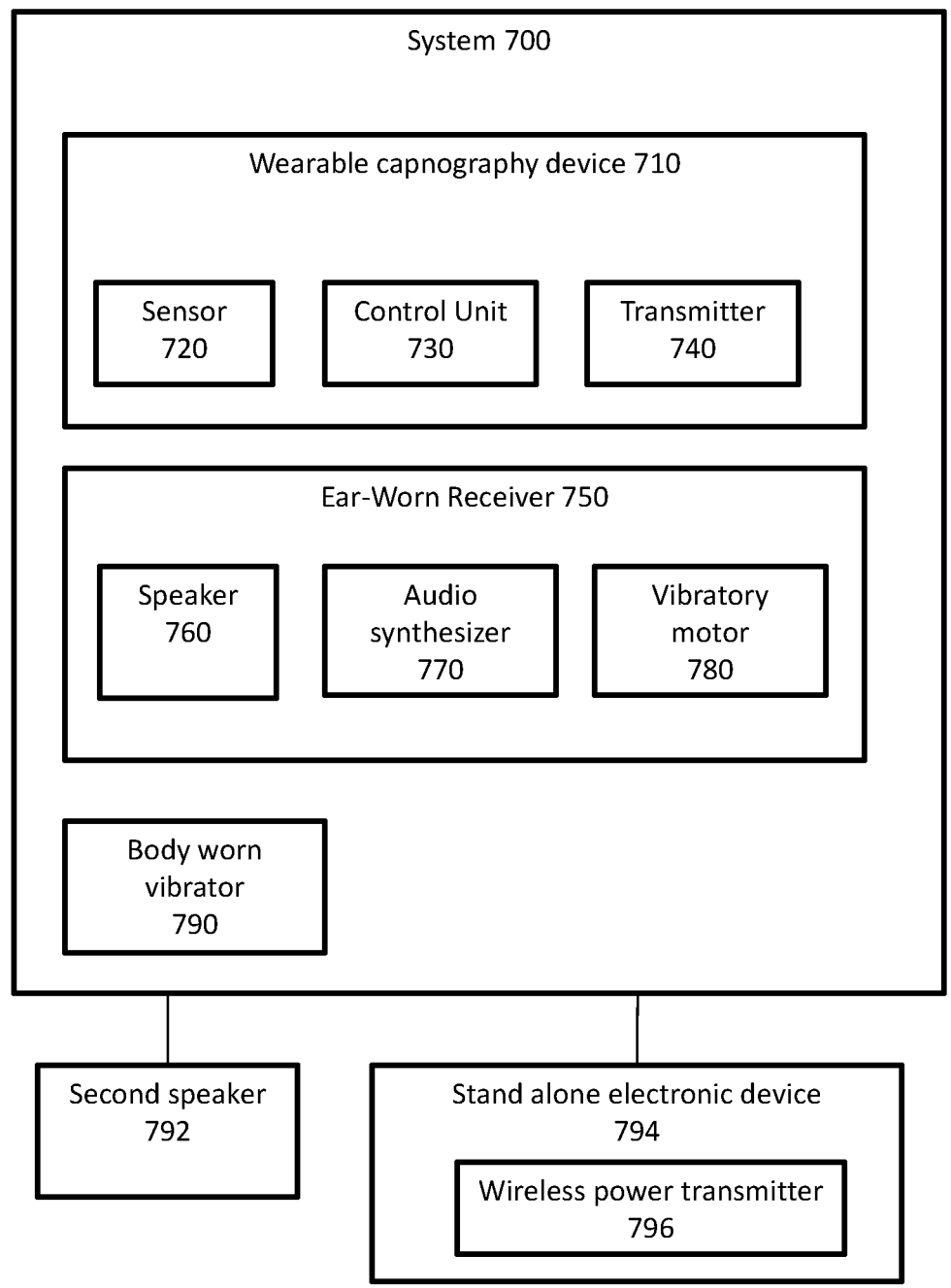
FIG. 7 is a block diagram showing the disclosed system, according to an exemplary embodiment of the present invention.

Referring to FIG. 7 which is a block diagram of a disclosed system 700 for continually monitoring $EtCO_2$ levels in a patient. The disclosed system 700 can include a wearable capnography device 710. The wearable capnography device 710 can include one or more sensors 720 for measuring $EtCO_2$ levels in exhaled air. A control unit 730 can optionally be provided to control one or more functions of the disclosed wearable capnography device 710, such as comparison of measured values with preset threshold values, sending signals or data to a receiver or any external electronic device. A transmitter 740 can also be provided for wireless communication with the receiver or any other electronic device. The system 700 can further include an ear-worn receiver 750 that can be wirelessly coupled to the wearable capnography device 710. The ear-worn receiver can include a speaker 760 for generating an audio alert. The speaker can be a buzzer, beeper, or similar audio alarm unit. The ear-worn receiver 750 can also include an audio synthesizer 770 for generating audio that can be outputted to the ear of the user. For example, the value of measured $EtCO_2$ values can be outputted during calibration. The ear-worn receiver 750 can also include a vibrator motor 780. The system 700 can also include a body-worn vibrator 790. It is to be noted that any one of the ear-worn receiver 750 and the body-worn vibrator can be used by the user or both. The disclosed system 700 can also be connected to a second speaker 792 which can be bigger and of a large capacity such that the audio from the second speaker can be heard in other rooms. Also, envisioned is a standalone electronic device 794 that can be wirelessly coupled to the body-worn vibrator 790 or the ear-worn receiver. The functioning of the standalone electronic device has been previously described and is not repeated here. The standalone electronic device can also include a wireless power transmitter 796 for transmitting power to the wearable capnography device 710.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A wearable capnography device comprising:
  a body implemented in a form of a piercing jewelry and configured to be worn in or nearby a nose or a mouth;
  at least one embedded miniature sensor configured to measure end-tidal partial pressure of carbon dioxide ($EtCO_2$) values, wherein the at least one embedded miniature sensor is configured to be positioned such that when the wearable capnography device is worn in or nearby the nose or the mouth, the at least one embedded miniature sensor is exposed to exhaled air from the nose or the mouth respectively,
  a transmitter for wirelessly communicating simultaneously with an external receiver and an ear-worn receiver, and
  a control unit operably coupled to the at least one embedded miniature sensor and the transmitter, the control unit is configured to:
    receive a signal from the at least one embedded miniature sensor,
    determine a current $EtCO_2$ value from the signal, and compare the current $EtCO_2$ value with a predefined threshold range,
    upon comparison, send a first signal to the ear-worn receiver and a second signal to the external receiver, wherein the ear-worn receiver generates an alarm signal in response to the first signal,
    monitor $EtCO_2$ values over a predefined duration; and
    increase the auditory volume of the alarm signal when there is no improvement in the $EtCO_2$ values over the predefined duration,
  wherein the wearable capnography device is configured to send messages and calls,
  wherein the messages and calls comprises recorded data values, trends, an indication of the severity of the medical conditions, and a geographical location.

2. The wearable capnography device according to claim 1, wherein the wearable capnography device is externally powered by a wireless power transmitter.

3. The wearable capnography device according to claim 1, wherein the ear-worn receiver is further configured to generate vibrations in response to the first signal, wherein the second signal is for only an audio alarm.

4. The wearable capnography device according to claim 1, wherein the control unit is configured to send the second signal when the current $EtCO_2$ values over the predetermined duration remain within undesired levels relative to the predetermined threshold.

5. The wearable capnography device according to claim 1, wherein the piercing jewelry is configured to be worn in a tongue.

6. The wearable capnography device according to claim 1, wherein the piercing jewelry is also configured to be concealed in tooth cavities.

7. A system to measure end-tidal partial pressure of carbon dioxide ($EtCO_2$) values in a user, the system comprising:
  a wearable capnography device comprising:
    a body implemented as piercing jewelry and configured to be worn in or nearby a nose or a mouth,
    at least one embedded miniature sensor configured to measure $EtCO_2$ values, wherein the at least one embedded miniature sensor is configured to be positioned such that when the wearable capnography device is worn in or nearby the nose or the mouth, the at least one embedded miniature sensor is exposed to exhaled air from the nose or the mouth respectively, and
    a transmitter for wirelessly communicating simultaneously with an external receiver and an ear-worn receiver; and
  the ear-worn receiver configured to be worn on an ear, wherein the ear-worn receiver is configured to receive a signal from the wearable capnography device, the ear-worn receiver configured to:
    output an audio alarm and vibrations to the ear of the user in response to the signal, wherein the signal comprises measured $EtCO_2$ values, wherein the signal is received in near-real time,
    compare measured $EtCO_2$ values with a preset threshold range, and upon comparison, send the audio alarm signal when the measured $EtCO_2$ values are outside the preset threshold range;
    monitor $EtCO_2$ values over a predefined duration; and
    increase the auditory volume of the audio alarm signal when there is no improvement in the $EtCO_2$ values over the predefined duration,
    output the measured $EtCO_2$ values to the ear as audio for calibration.

8. The system according to claim 7, wherein an intensity of the audio alarm and the vibrations are proportional to a measured $EtCO_2$ value.

9. A method for alerting a user for hypoventilation or apnea, the method comprising:
  wearing a wearable capnography device in a nose or mouth, wherein the wearable capnography device comprises:
    at least one miniature embedded sensor configured to measure end-tidal partial pressure of carbon dioxide ($EtCO_2$) values, wherein the at least one embedded miniature sensor is configured to be positioned such that when the wearable capnography device is worn in the nose or the mouth, the at least one miniature sensor is exposed to exhaled air from the nose or the mouth respectively, and a transmitter for wirelessly communicating with an ear-worn receiver;

wearing the ear-worn receiver in an ear;

measuring, by the at least one embedded miniature sensor, an $EtCO_2$ value from the exhaled air;

comparing the measured $EtCO_2$ value with a preset threshold values range;

upon comparison, send at least one signal to the ear worn receiver for triggering an alarm when the measured values are outside the preset threshold values range, wherein the ear-worn receiver upon receiving the at least one signal generates an audio and vibratory alarm output to the ear;

monitor $EtCO_2$ values over a predefined duration;

increase the auditory volume of the audio alarm signal when there is no improvement in the $EtCO_2$ values over the predefined duration;

sending by the wearable capnography device to the ear-worn receiver measured $EtCO_2$ values in near-real time, wherein the ear-worn receiver is configured to output the measured $EtCO_2$ values to the ear as audio;

presenting $EtCO_2$ values measured by a standard calibrated capnography device; and comparing the measured $EtCO_2$ values received as audio relative to values displayed on the standard calibrated capnography device, in near real time, for calibration.

* * * * *